US012782632B2

(12) United States Patent
Chen et al.

(10) Patent No.: US 12,782,632 B2
(45) Date of Patent: Nov. 3, 2026

(54) SENSITIVITY-ENHANCED BROADBAND ACOUSTIC SENSOR BASED ON GROOVED SUSPENDED WAVEGUIDE RING RESONATOR

(71) Applicant: The North University of China, Taiyuan (CN)

(72) Inventors: Jiamin Chen, Taiyuan (CN); Yongqiu Zheng, Taiyuan (CN); Chenyang Xue, Taiyuan (CN); Jiandong Bai, Taiyuan (CN); Juan Cui, Taiyuan (CN); Yifan Luo, Taiyuan (CN); Fan He, Taiyuan (CN)

(73) Assignee: The North University of China, Taiyuan City (CN)

( * ) Notice: Subject to any disclaimer, the term of this patent is extended or adjusted under 35 U.S.C. 154(b) by 379 days.

(21) Appl. No.: 18/603,356

(22) Filed: Mar. 13, 2024

(65) Prior Publication Data

US 2025/0291108 A1 Sep. 18, 2025

(51) Int. Cl.
*G02B 6/12* (2006.01)
*G01H 9/00* (2006.01)
*G02B 6/293* (2006.01)

(52) U.S. Cl.
CPC ........... *G02B 6/12007* (2013.01); *G01H 9/00* (2013.01); *G02B 2006/12038* (2013.01); *G02B 2006/12138* (2013.01); *G02B 6/29338* (2013.01)

(58) Field of Classification Search
CPC ............ G02B 6/12007; G02B 6/29338; G02B 2006/12038; G02B 2006/12138; G01H 9/00; G01H 9/004
See application file for complete search history.

(56) References Cited

U.S. PATENT DOCUMENTS 7,333,703 B2 * 2/2008 Hatsuda ................. B82Y 20/00
65/393
9,915,785 B2 * 3/2018 Lin ......................... G02B 6/122
12,416,760 B2 * 9/2025 Zandi ...................... G02B 6/132
2004/0114899 A1 * 6/2004 Mattsson ............... G02B 6/136
385/129
2023/0341638 A1 * 10/2023 Chiu .................. G02B 6/12007

* cited by examiner

*Primary Examiner* — John Bedtelyon

(57) ABSTRACT

Disclosed is a sensitivity-enhanced broadband acoustic sensor based on a grooved suspended waveguide ring resonator, including a lower cladding layer and an upper cladding layer. A single straight waveguide core layer and a ring waveguide core layer are arranged between the upper cladding layer and the lower cladding layer. A coupling distance is arranged between the single straight waveguide core layer and the ring waveguide core layer; the other end face of the lower cladding layer opposite to the ring waveguide core layer is arranged with a suspended waveguide air groove, and the suspended waveguide air groove is located directly below the ring waveguide core layer. In the ring resonator, the response of a micro-cavity to acoustic waves can be enhanced by utilizing the mechanical vibration effect generated by an acoustically suspended waveguide, further enhancing the sensitivity of acoustic sensing.

3 Claims, 2 Drawing Sheets

SENSITIVITY-ENHANCED BROADBAND ACOUSTIC SENSOR BASED ON GROOVED SUSPENDED WAVEGUIDE RING RESONATOR

TECHNICAL FIELD

The present application relates to the technical field of sensing technology, in particular to a sensitivity-enhanced broadband acoustic sensor based on a grooved suspended waveguide ring resonator.

BACKGROUND

Nowadays, the world is in a new stage of leading innovation comprehensively by informatization and reconstructing the country's core competitiveness on the basis of informatization. The new generation of information technology, represented by artificial intelligence, quantum information, mobile communication and Internet of Things, accelerates the breakthrough of application and becomes an important force to promote the development of the world and the progress of social life. Sensor technology is one of the three pillars of modern information industry. People can directly or indirectly acquire external information such as acoustic waves, vibration, temperature and strain by utilizing the sensor technology, thereby acquiring the internal structure and properties of natural medium. Acoustic signals can be used as ideal information carriers because they carry abundant media information during propagation. By detecting, tracking and analyzing the propagation characteristics of acoustic waves in a medium, people can acquire the internal properties and characteristics of the environment associated with the medium. For example, the precise structure inside a small-scale medium can be acquired by ultrasonic imaging; the geological structure information can be acquired by tracing the generation and transmission characteristics of the seismic wave signals in the infrasonic section of the strata, thereby performing early warning on geological disasters or exploring underground natural resources; and the structural health state can be monitored by analyzing the changes of acoustic field in bridge, transportation pipeline, rail and other infrastructure facilities.

At present, electroacoustic sensors are the most mature ones in commercialization, but they have inherent defects such as no resistance to electromagnetic interference and harsh environment. In addition, conventional piezoelectric transducers are typically designed to be highly resonant to achieve the required sensitivity, resulting in a narrow bandwidth and resonance-induced ringing. Moreover, most electroacoustic sensors are based on the acoustic sensing principle of diaphragm deformation, and the sensitivity decreases rapidly as the size of a sensitive diaphragm decreases. Fiber-optic acoustic sensors have been developed rapidly in recent years, and have been applied in the fields of national defense security, industrial nondestructive testing, medical diagnosis and consumer electronics with the advantages of high sensitivity, wide band response, electromagnetic interference resistance and miniaturization. However, it is also limited by the material, size and thickness of the acoustic sensitive material, such as thin film or other deformable material. Most fiber-optic acoustic sensors are difficult to achieve high-sensitivity and broadband acoustic sensing simultaneously in weak acoustic signal measurement applications such as structural health monitoring, disaster warning and underwater acoustic sensing.

Therefore, there is a need to develop a fiber-optic acoustic sensor that can be used as an excellent platform for high-sensitivity and broadband acoustic sensing to meet the actual needs of applications such as weak acoustic detection, sleep monitoring, high-quality speech signal acquisition and reconstruction.

SUMMARY

The present disclosure provides a sensitivity-enhanced broadband acoustic sensor based on a grooved suspended waveguide ring resonator to realize high-sensitivity and broadband acoustic sensing, further improve the detection accuracy and resolution of weak acoustic signals to solve the technical problems.

In order to achieve the above object, the present disclosure adopts the following technical solutions. A sensitivity-enhanced broadband acoustic sensor based on a grooved suspended waveguide ring resonator includes a lower cladding layer, and an upper cladding layer located on the lower cladding layer and integrated with the lower cladding layer. A single straight waveguide core layer and a ring waveguide core layer are arranged between the upper cladding layer and the lower cladding layer, and the single straight waveguide core layer and the ring waveguide core layer are located on the same plane. There is a coupling distance between the single straight waveguide core layer and the ring waveguide core layer. The other end face of the lower cladding layer opposite to the ring waveguide core layer is arranged with a suspended waveguide air groove, and the suspended waveguide air groove is located directly below the ring waveguide core layer.

Light is input from one end of the single straight waveguide core layer; and when the light passes through a coupling region between the single straight waveguide core layer and the ring waveguide core layer, a part of the light is coupled into a ring resonator formed by the ring waveguide core layer, and is transmitted around the ring resonator.

Preferably, a coupling distance arranged between the single straight waveguide core layer and the ring waveguide core layer is between 5.1 μm and 6.0 μm.

Preferably, the upper cladding is provided with an acoustic sensitive air groove, which is located above the ring waveguide core layer.

Preferably, the upper cladding layer and the lower cladding layer are made of silicon dioxide, and the single straight waveguide core layer and the ring waveguide core layer are made of germanium-doped silicon dioxide.

Preferably, the single straight waveguide core layer and the ring waveguide core layer have a higher refractive index than the upper cladding layer and the lower cladding layer.

Preferably, two ends of the single straight waveguide core layer are aligned with end faces of the lower cladding layer.

Preferably, a quality factor of the ring resonator formed by the ring waveguide core layer is not less than $10^6$.

The present disclosure has the following advantageous effects.

1. Light is input from one end of the single straight waveguide core layer; and when the light passes through a coupling region between the single straight waveguide core layer and the ring waveguide core layer, a part of the light is coupled into a ring resonator, and is transmitted around the ring resonator. Each time the light passes through the coupling region, a part of light is coupled into the single straight waveguide core layer 1. Each time the light passes through the coupling region, the light that a phase shift of one transmission cycle is exactly equal to 2 in the ring resonator is localized in the ring resonator and continues to transmit, and the constructive interference occurs. Therefore, for the light wave whose wavelength just meets the resonance condition, the light energy is localized in the ring resonator, thereby forming a very high energy density in the cavity and improving the detection sensitivity.

2. A micro air groove is etched on the surface of the upper cladding layer of the ring waveguide core layer of the ring resonator, which can lead out the evanescent wave and reduce the loss of the quality factor of the ring resonator to the maximum extent. The interaction between the evanescent wave and the acoustic wave can change the effective refractive index of the ring waveguide core layer, thereby causing a resonance frequency shift of the ring resonator and realizing the high-sensitivity and broadband acoustic sensing.

3. A micro-cavity optical force system is formed by simultaneously etching a ring groove on the substrate of the ring resonator downwards to the lower cladding layer to cause the entire ring waveguide core layer to suspend on the silicon substrate. In the ring resonator, the response of a micro-cavity to acoustic waves can be enhanced by utilizing the mechanical vibration effect generated by acoustic acting on the suspended waveguide in the ring resonator, thereby further enhancing the sensitivity of acoustic sensing.

DETAILED DESCRIPTION

Hereinafter, the present disclosure is further described with reference to the attached drawings and implementations.

EXAMPLES

Figure 1:
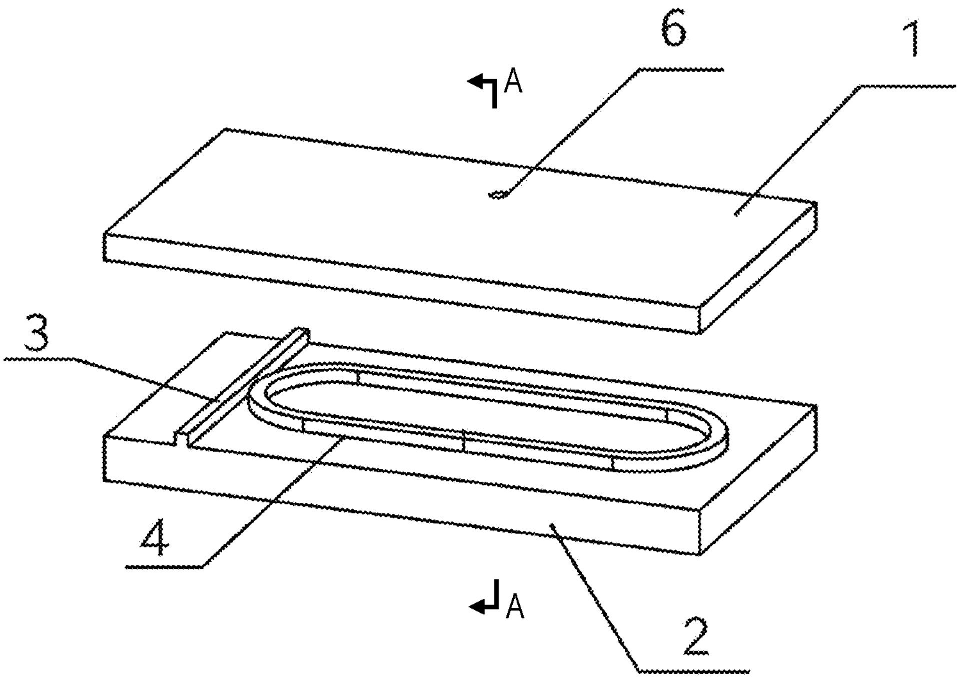
FIG. 1 is a structural schematic diagram of a sensitivity-enhanced broadband acoustic sensor based on a grooved suspended waveguide ring resonator of the present disclosure.
Figure 2:
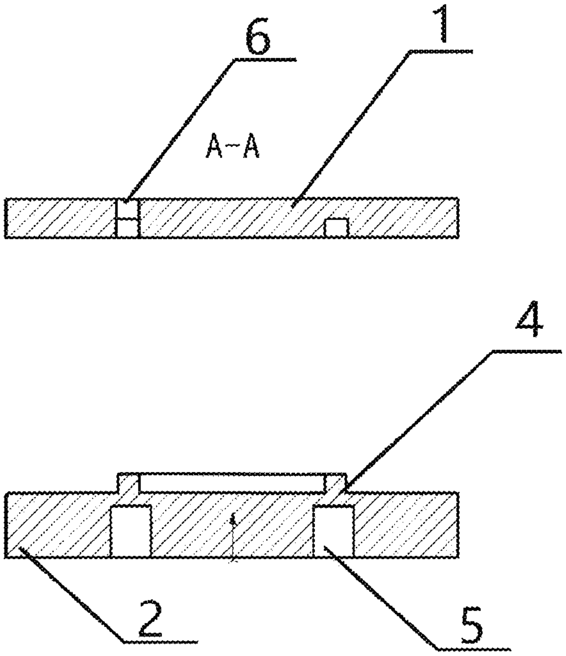
FIG. 2 is a schematic cross-sectional view taken along A-A in FIG. 1.

As shown in FIGS. 1 and 2, a sensitivity-enhanced broadband acoustic sensor based on a grooved suspended waveguide ring resonator includes a lower cladding layer 2, and an upper cladding layer 1 located on the lower cladding layer 2 and integrated with the lower cladding layer 2. A single straight waveguide core layer 3 and a ring waveguide core layer 4 are arranged between the upper cladding layer 1 and the lower cladding layer 2, two ends of the single straight waveguide core layer 3 are aligned with end faces of the lower cladding layer 2, and the ring waveguide core layer 4 is a runway type. The single straight waveguide core layer 3 and the ring waveguide core layer 4 are located on the same plane, and there is a coupling distance between the single straight waveguide core layer 3 and the ring waveguide core layer 4. In the example, preferably, the distance is 5.6 μm. In preparation, the lower cladding layer 2 is deposited on a silicon substrate, then the single straight waveguide core layer 3 and the ring waveguide core layer 4 are obtained on the lower cladding layer 2 by deposition and photolithography, and the upper cladding layer 1 is deposited on the single straight waveguide core layer 3 and the ring waveguide core layer 4 to obtain an integrated optical waveguide ring resonator.

The silicon dioxide material is selected as the upper cladding layer 1 and the lower cladding layer 2, and the germanium-doped silicon dioxide material is selected as the single straight waveguide core layer 3 and the ring waveguide core layer 4. The single straight waveguide core layer 3 and the ring waveguide core layer 4 have a higher refractive index than the upper cladding layer 1 and the lower cladding layer 2, so that light can be propagated in a form of total reflection in the ring resonator. A quality factor of the formed ring resonator is not less than $10^6$, and the formed ring resonator has strong light-localization ability and sensitive detection accuracy.

A suspended waveguide air groove 5 is arranged on a lower surface of the lower cladding layer 2, namely, a sound receiving surface, or a suspended waveguide air groove 5 is arranged on a substrate layer at a bottom of the lower cladding layer 2. The suspended waveguide air groove 5 is similar to the shape of the ring waveguide core layer 4 and is located directly below the ring waveguide core layer 4, and the ring waveguide core layer 4 is suspended above the suspended waveguide air groove 5. When the sound is received, due to the presence of the suspended waveguide air groove 5, the deformation of the ring waveguide increases, thereby improving the accuracy of acoustic detection.

Specifically, in operation, the light is input from one end of the single straight waveguide core layer 3; and when the light passes through a coupling region between the single straight waveguide core layer 3 and the ring waveguide core layer 4, a part of the light is coupled into the ring resonator formed by the ring waveguide core layer 4, and is transmitted around the ring resonator. Each time the light passes through the coupling region, the light that a phase shift of one transmission cycle is exactly equal to $2\pi$ in the ring resonator is localized in the ring resonator and continues to transmit, and the constructive interference occurs. The light that does not meet the phase condition is coupled into the single straight waveguide core layer and has destructive interference with the transmitted light of the single straight waveguide core layer.

Figure 3:
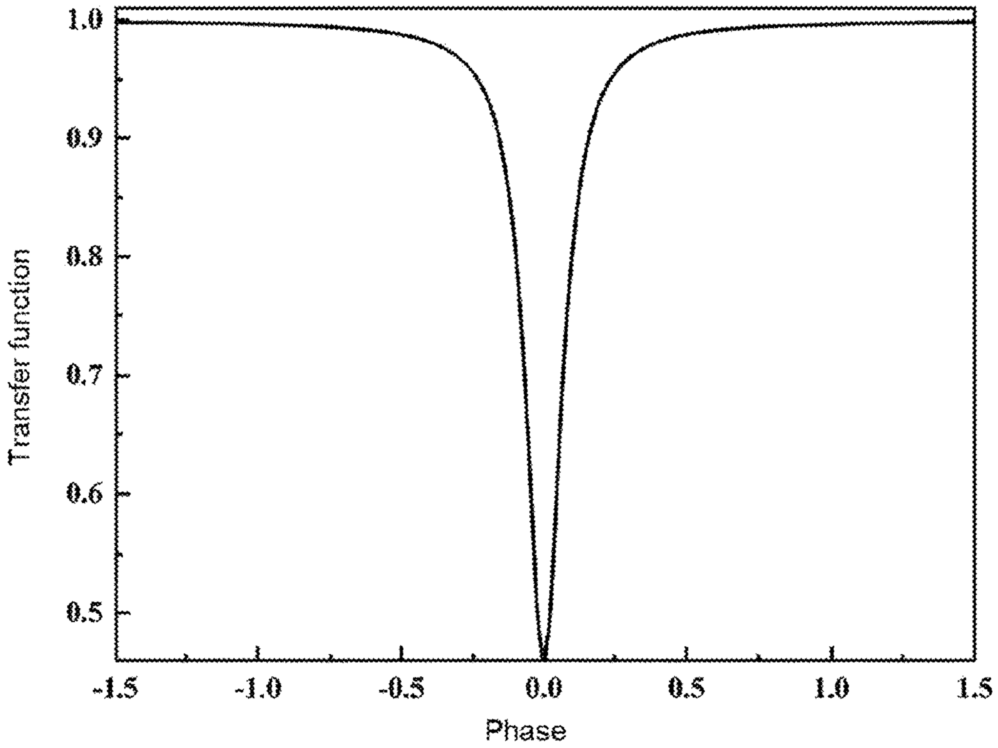
FIG. 3 is an intrinsic resonance diagram of a ring resonator of the present disclosure.

Therefore, for the light wave whose wavelength just meets a resonance condition, the light energy is localized in the ring resonator, thereby forming a very high energy density in the cavity. The light energy localization effect of the ring resonator determines that it can be used as a high-sensitive sensing unit. Specifically, in the ring resonator as shown in FIG. 3, the response of a micro-cavity to acoustic waves can be enhanced by utilizing the mechanical vibration effect generated by acoustic acting on the suspended waveguide in the ring resonator, thereby further enhancing the sensitivity of acoustic sensing.

In another example, an acoustic sensitive air groove 6 is arranged on the upper cladding layer 1. The acoustic sensitive air groove 6 is located above the ring waveguide core layer 4. A micro air groove is etched on the surface of the upper cladding layer 1 to the core layer to extract evanescent waves The interaction between the evanescent wave and the acoustic waves changes an effective refractive index of waveguide and causes a resonance frequency shift of the ring resonator, thereby realizing the sensing detection of external acoustic waves. A micro-cavity photomechanical system is formed by etching the suspended waveguide air groove 5 upwards on the lower surface of the lower cladding layer 2 or a base layer below the lower cladding layer 2, and the acoustic wave acts on the suspended ring waveguide core layer to cause the mechanical vibration effect of the waveguide, so that the sensitive response of the ring resonator to the acoustic wave can be enhanced. Compared with the principle of acoustic detection using only mechanical deformation of sensitive material or medium refractive index change of diaphragm-free, it can have higher sensing sensitivity while maintaining broadband acoustic sensing.

The signal demodulation is achieved through relevant techniques of phase modulation spectrum detection and high-frequency carrier synchronous demodulation. The frequency of a laser is stably locked to a resonance frequency point of the ring resonator, and then the weak acoustic signal is extracted from an output signal of the signal modulation and demodulation module via a low-pass filter and a proportional-integral-derivative control module. These technologies are well known in the prior art and can be easily realized by those skilled in the art. Therefore, it is not described in detail in this specification.

Figure 4:
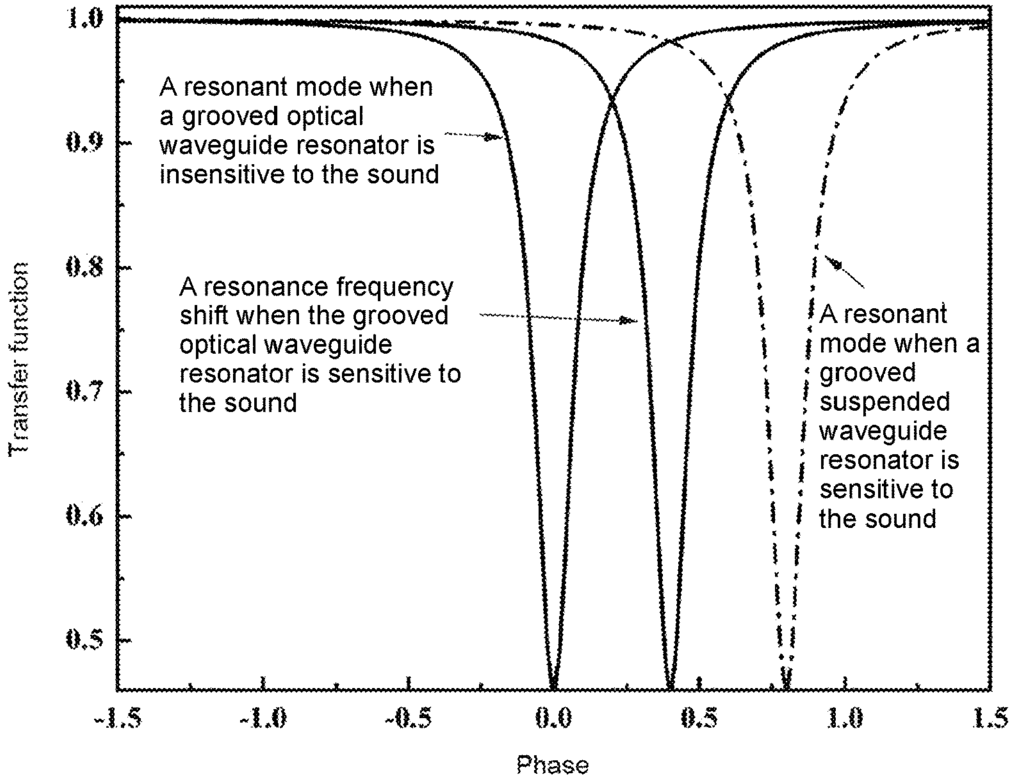
FIG. 4 is a resonance peak shift diagram influenced by acoustic signals of the sensitivity-enhanced broadband acoustic sensor based on a grooved suspended waveguide ring resonator of the present disclosure.

As shown in FIG. 4, it is an innovation in the field of high-sensitivity and broadband acoustic sensors that the acoustic signal is sensitive by detecting the resonance frequency shift caused by the effective refractive index change of waveguide caused by the action of evanescent wave and acoustic wave on the surface of ring resonator, and the sensitivity of acoustic response is further enhanced by the mechanical vibration effect caused by micro-cavity optical force mechanism in the ring resonator, without affecting the frequency band.

The foregoing examples are merely illustrative of the present disclosure and are not to be construed as limiting the protection scope of the present disclosure. Any design that is the same as or similar to the present disclosure belongs to the protection scope of the present disclosure.

The invention claimed is:

1. A sensitivity-enhanced broadband acoustic sensor based on a grooved suspended waveguide ring resonator, comprising a lower cladding layer (2), and an upper cladding layer (1) located on the lower cladding layer (2) and integrated with the lower cladding layer (2), wherein a single straight waveguide core layer (3) and a ring waveguide core layer (4) are arranged between the upper cladding layer (1) and the lower cladding layer (2), the single straight waveguide core layer (3) and the ring waveguide core layer (4) are located on a same plane, and a coupling distance is arranged between the single straight waveguide core layer (3) and the ring waveguide core layer (4); and an end face of the lower cladding layer (2) opposite to the ring waveguide core layer (4) is arranged with a suspended waveguide air groove (5), and the suspended waveguide air groove (5) is located directly below the ring waveguide core layer (4); and light is input from one end of the single straight waveguide core layer (3); and when the light passes through a coupling region between the single straight waveguide core layer (3) and the ring waveguide core layer (4), a part of the light is coupled into a ring resonator formed by the ring waveguide core layer (4), and is transmitted around the ring resonator, wherein an acoustic sensitive air groove (6) is arranged on the upper cladding layer (1) and is above the ring waveguide core layer (4), wherein the single straight waveguide core layer (3) and the ring waveguide core layer (4) have a higher refractive index than the upper cladding layer (1) and the lower cladding layer (2), wherein two ends of the single straight waveguide core layer (3) are aligned with end faces of the lower cladding layer (2), and wherein a quality factor of the ring resonator formed by the ring waveguide core layer (4) is not less than $10^6$.

2. The sensitivity-enhanced broadband acoustic sensor based on a grooved suspended waveguide ring resonator according to claim 1, wherein the coupling distance arranged between the single straight waveguide core layer (3) and the ring waveguide core layer (4) is between 5.1 um and 6.0 um.

3. The sensitivity-enhanced broadband acoustic sensor based on a grooved suspended waveguide ring resonator according to claim 1, wherein the upper cladding layer (1) and the lower cladding layer (2) are made of silicon dioxide, and the single straight waveguide core layer (3) and the ring waveguide core layer (4) are made of germanium-doped silicon dioxide.

* * * * *